June 27, 1950    T. A. TE GROTENHUIS    2,512,697
METHOD OF MAKING SYNTHETIC RUBBER-CARBON
BLACK COMPOSITIONS WITHOUT MASTICATION Filed March 24, 1944    2 Sheets-Sheet 1

INVENTOR.
Theodore A. Te Grotenhuis
BY Evans + McCoy
ATTORNEYS

Patented June 27, 1950

2,512,697

UNITED STATES PATENT OFFICE 2,512,697

METHOD OF MAKING SYNTHETIC RUBBER-CARBON BLACK COMPOSITIONS WITHOUT MASTICATION

Theodore A. Te Grotenhuis, Olmsted Falls, Ohio

Application March 24, 1944, Serial No. 527,929

21 Claims. (Cl. 260—29.7)

This invention relates to articles of rubberlike material containing carbon black distributed therethrough and to the method of making the articles. It particularly relates to a method of making articles of rubberlike material wherein the carbon black is distributed throughout without deteriorating the rubberlike material by mastication thereof.

Mastication of natural rubber has been generally recognized as undesirable for the reasons that it requires the use of heavy machinery and expenditure of large amounts of power; it causes deterioration of the rubber by tearing apart and shortening the molecules thereof with resultant decrease in wearing properties, age resistance and strength. Articles made directly from latex without mastication have better age resistance and wearing properties than articles prepared from unreinforced, masticated gum rubber stock made from latex rubber of the same composition.

Rubber reinforced by carbon black has not, however, heretofore been made from a rubber latex without a masticating step. When carbon black is added to a natural rubber latex or simply mixed into an emulsion of synthetic rubber, it acts merely as an inert filler or coloring material and diluent with no material reinforcing effect. When latex containing carbon black is coagulated and the rubber masticated, however, the carbon black then acts as a reinforcing agent.

The reason for the great improvement by mastication of rubber and carbon black mixes has not been apparent. There are three changes which may be caused by mastication, any one of which could possibly account for the outstanding improvement obtained by masticating a rubber-carbon black mix as distinguished from simply mixing the carbon black in a latex, coagulating the materials and forming the shaped rubber article without any masticating step.

Mastication may cause rubbing of the carbon black particles against the rubber, removing a portion of the adsorbed gases or hydrocarbon on the surface of the carbon particles, so that a more intimate contact is effected between the rubber and the carbon and a strong bond thus produced. Mastication may cause the carbon black to enter the individual globules of the rubber instead of remaining on the surface, as when the rubber of a latex and carbon black are precipitated together; or mastication may by shortening the molecules of the rubber and increasing its plasticity cause better wetting of the carbon black by the rubberlike material.

Since the reasons are not apparent for the improvement of these natural and synthetic rubbers by masticating carbon black therein, industry has relied on the mastication step in all of its commercial operations for making carbon black-reinforced rubbers of all kinds.

The processes heretofore proposed for the manufacture of articles from the synthetic rubbers have been substantially identical with the processes proposed for the manufacture of reinforced rubber articles from natural rubber.

An object of the present invention is to provide a method of making rubberlike materials reinforced in tensile strength by carbon black, wherein the natural molecular structure of the rubber is not necessarily broken down by mastication and wherein the rubberlike material is a rubbery polymer or copolymer of a material containing a substantial, or preferably a major portion of a conjugated diene such as butadiene, homologues or analogues thereof, with or without one or more copolymerizable substances, such as styrene, vinyl compounds including acrylates, acrylicnitrile, methylmethacrylate and methylacrylate and homologues thereof, vinyl pyridine, allyl chloride, methallyl chloride, etc.

Another object is to provide a method of making a carbon black-reinforced rubberlike article from polymerizable materials capable of producing a rubberlike polymer, wherein break down of the polymer is unnecessary and wherein superior properties are had in the rubbery material produced.

Another object is to provide carbon black-reinforced rubberlike articles from a copolymer of butadiene, or other conjugated diene, and one or more resin-forming materials, such as styrene, acrylonitrile, acrylates, etc., which have not been deteriorated by mastication.

Another object is to provide a method of making such articles without mastication wherein a rubber such as reclaim or natural rubber may also be utilized in combination with the butadiene and one or more materials capable of polymerizing to a resin.

A further object is to provide an unmasticated rubbery molding powder reinforced with carbon black, a method of making such a molding powder of a substantially unmasticated rubbery polymer, and a methor of utilizing such molding powder to cause it to entirely coalesce directly in the desired shape with the aid of heat and pressure, so that in the cured state, the articles will be highly reinforced by the carbon black without resort to mastication.

A further object is to provide articles contain ing unmasticated rubberlike materials reinforced in tensile strength by carbon black and in which the rubberlike material is firmly bonded to metal.

A further object is to provide articles having at least a portion of vulcanized rubberlike polymers reinforced with carbon black and having the abrasion resistance of material that has not been deteriorated by mastication.

A still further object is to provide a sponge rubber of reinforced, substantially unmasticated rubberlike polymers.

It is still another object to provide an unmasticated molding powder reinforced with carbon black, a method of making such a molding powder from a substantially unmasticated copolymer of a conjugated diene and one or more relatively hard resin-forming materials, and a method of utilizing such molding powder to cause it to entirely coalesce directly in the desired shape with the aid of heat and pressure, so that in the cured state, the articles will be highly reinforced by the carbon black without resort to mastication.

It is still another object to provide articles having at least a portion of vulcanized rubberlike copolymers reinforced with carbon black and having the abrasion resistance of material that has not been deteriorated by mastication.

It is still another object to provide a rubbery synthetic emulsion polymer having carbon black dispersed therethrough to provide improved properties without the necessity for mastication.

In my prior applications, Serial No. 355,497, filed September 5, 1940, now abandoned, Serial No. 463,023, filed October 23, 1942, now abandoned, and Serial No. 470,802, filed December 31, 1942, now abandoned, of which the present application is a continuation-in-part, I disclosed the method of preparing articles from substantially unmasticated rubberlike material, wherein finely divided carbon is brought into intimate contact with monomer as by dispersing it in a monomeric material or mixture capable of being polymerized to a rubbery polymer preferably of a type reinforceable by carbon black. The mixture containing the black is then emulsified in an aqueous solution or dispersion of a suitable emulsifying agent and/or protective colloid. The emulsifying agent and/or protective colloid are preferably present in sufficient quantity to cause the formation of and to maintain throughout the polymerization an oil-in-water type of emulsion instead of the water-in-oil type of emulsion that is most easily formed when the carbon black-monomer mixture is mixed with water.

The monomeric material may consist of one polymerizable material or many copolymerizable materials, as set forth in my prior applications. Preferably, the monomeric material contains a compatible thickener such as a polymer of the same or similar type of monomeric material, a resin soluble in the monomer, a small amount of a rubbery material such as a natural rubber, a polymer of butadiene, liquids having one or more of butadiene and lower homologues thereof in major proportion, e. g. a butadiene-styrene copolymer, a butadiene-acrylonitrile copolymer, a reclaim rubber or the like which is soluble in the monomer, or even a monomer-soluble soap such as zinc naphthenate, zinc resinate, lead stearate or other heavy metal soap. The thickener, which preferably is of a type capable of swelling and forming a gel structure in the particular monomer, acts with the carbon black-dispersing or antiagglomerating agent soluble in the monomer to facilitate dispersion or deagglomeration of the black and to increase viscosity of the dispersed globules and thereby decrease the tendency of finely divided carbon or carbon black to agglomerate. Since the function of the thickener is primarily to increase viscosity, any resin soluble in the monomer or any material capable of increasing viscosity of the monomer may be advantageous. The thickener should not however, have a strong inhibiting effect on polymerization of the particular monomer as do some phenolic resins. Thickeners soluble in one monomer are often unsuitable in another because they are there insoluble. Thus, for example, natural rubber or polyisobutylene, which are especially desirable for a monomer comprising butadiene and styrene, are only very slightly soluble in a monomer comprising butadiene and substantial proportions of acrylonitrile. A butadiene-acrylonitrile copolymer, or the like, previously extracted to remove any inhibitors present, is on the other hand soluble and entirely satisfactory in the butadiene-acrylonitrile mix.

If there is any doubt about the suitability of a particular thickener with a particular monomer, a test should be made to determine the gelling properties and the solubility of the thickener in the monomer by placing 5 or 10% of the thickener in the monomer, agitating and allowing it to remain for a short period of time. If it is soluble, a homogeneous mass more viscous than the original monomer is produced. By polymerizing a small amount of the monomer-thickener mix, with or without the hereinafter described antiagglomerating agents, and comparing the rate of polymerization with that of a similar monomer having no thickener or antiagglomerant, the suitability of these materials may be readily ascertained. Examples of resinous thickeners that may be used are: vinyl resins, including polyvinyl chloride; copolymers of vinyl chloride and vinyl esters; polyacrylates, including methyl methacrylate and polyethyl acrylate; monomer-soluble polyvinyl acetylenes all of which are of course polymers of olefinic compounds; as well as monomer-soluble cellulose ethers such as highly methylated cellulose, monomer-soluble polyesters, polyamides and the like.

Instead of the completely polymerized resins, partial polymers may be utilized and are often preferred to provide increased solubility.

The rubbery and resinous thickeners which are of course high polymers are preferred as they have less tendency than soaps to act as water-in-oil emulsifying agents and thus tend to neutralize the water-soluble emulsifying agents used.

A substantial proportion of a monomer-soluble, oil-soluble or monomer-miscible carbon black-dispersing or antiagglomerating agent is also preferred in the monomer-carbon black mix to facilitate dispersion and to maintain the black in dispersed form in the monomer.

Examples of carbon black-dispersing or wetting agents found to be suitable in monomers comprising butadiene or other conjugated dienes, particularly when one or more conjugated dienes are in major proportion, are: lecithins, such as oil-soluble soya lecithin; asphalts, including gilsonite; anhydrous ammonia and certain derivatives thereof, including long chain or oil-soluble amine compounds, including long chain fatty acid amides, e. g. stearylamide and derivates thereof; ink lengthener, believed to be a residue from oil distillations; certain water-insoluble metal soaps, such as oil-soluble naphthenates, including zinc naphthenates; rosins, including wood rosin, hydrogenated wood rosin, etc.; and water-insoluble rosinates, such as zinc rosinate. One or more of the agents having a dispersing or antiagglomerating effect may be used. Monomer-insoluble amines which have a dispersing effect in monomers and other materials such as anhydrous ammonia may be added to the black by exposing it to vapors thereof or to a solution of the material in anhydrous solvent; preferably the antiagglomerating materials are monomer-soluble, compatible with the system of emulsion polymerization used, and are incorporated in the monomer directly.

Materials having a desirable effect in dispersing and preventing agglomeration of carbon black in one monomer sometimes have very little effect in another monomer. The suitability of an agent may be readily determined experimentally by forming a heavy buttery paste of carbon black and the monomer or liquid chemically similar to the monomer to be used. Gasoline, kerosene or styrene may usually be used in place of butadiene for convenience. The carbon black-monomer paste is spread under substantially non-drying conditions on a clean glass plate and separate portions of the paste worked respectively with and without the addition of small amounts of the agent whose dispersing or anti-agglomerating qualities are being considered.

Materials which are effective as antiagglomerating or carbon black-dispersing agents cause a marked decrease or break in the viscosity of the buttery paste to which they are added when the paste is strongly worked, whereas no noticeable decrease in viscosity of the paste containing no addition is had. Thus small amounts of highly effective agents, such as the above-mentioned lecithin, long chain (oil-soluble) amines, asphalt, etc., usually cause a stiff buttery paste of carbon black and butadiene or isoprene, styrene, etc. to break into a creamy fluid.

Any of the various materials or mixtures compatible with the polymerization system and giving decreased viscosity in the above test may be used in the production of reinforced rubbery polymers of the present invention. It is, therefore, intended that the terms "antiagglomerating agent" or "carbon black-dispersing agent" soluble in the polymerizable liquid, as used herein designate such compounds or mixtures which cause a substantial change in viscosity in the above-mentioned test procedure.

The selection of the antiagglomerating agent also depends on its compatibility with the emulsifier and with the system of emulsion polymerization to be used. The antiagglomerating agent and the emulsifier or other agents in the system should not react to neutralize the effect of either. Tests for compatibility may readily be made by emulsifying a plain solution in the monomer of the antiagglomerating agent, in the absence of carbon black, in an aqueous solution of the emulsifying or stabilizing agent to be used. If the ingredients are not compatible, a visible precipitate or breaking of the emulsion will be apparent, or extreme difficulty in obtaining a stable emulsion will be experienced. Thus, with acidic emulsifying systems or with acidic acid-stable emulsifying agents, relatively non-reactive materials, such as asphalt, e. g. gilsonite, are usually preferred, although materials such as rosin, not reactive with acid, may be suitable. With alkaline or neutral systems, afore-mentioned lecithin, fatty acid amides and certain water-insoluble soaps are preferred.

Conventional emulsifying agents may be utilized in the polymerization process to stabilize or form an oil-in-water type of emulsion. In the acid-stable polymerization systems, quaternary ammonium emulsifying agents or cation-active emulsifying agents are usually used. In the alkaline or neutral systems, other suitable emulsifying agents, including water-soluble soaps such as triethanolamine oleate, stearate or palmitate, sodium oleate, sodium stearate and alkali metal soaps, e. g. rosin alkali metal soaps and other agents suitable for forming oil-in-water type emulsions are usually desired. Other examples of such emulsifying and wetting agents are set forth in the lists of surface active agents, starting pages 17 and 127, vol. 33, January 1941, and vol. 35, January 1943, respectively, of "Industrial and Engineering Chemistry."

Carbon black, particularly if it is not suitably dispersed in the monomer and retained therein in dispersed condition, tends to pass to the water-monomer interface and then acts as a water-in-oil type of emulsifying agent, thus tending to reverse the phase of the oil-in-water emulsions. Therefore, the concentration of oil-in-water type of emulsifying agent should be sufficiently great to overcome the tendency for the formation of water-in-oil emulsions; or such tendency should be overcome by the presence of a considerable quantity of a hydrophilic colloid or oil-in-water type of stabilizing agent, or both, which preferably is in addition to the surface active type of emulsifying agent, if the latter is used.

The quantities of emulsifying agent and protective colloids are chosen so that an oil-in-water type of emulsion may be maintained throughout the entire polymerization process with a larger proportion of hydrophilic colloid, such for example as casein, gum, gum tragacanth, gum arabic, or other water-soluble gums, alkali metal alginates such as sodium alginate, cellulose ethers such as water-soluble or swellable methyl cellulose or ethyl cellulose, etc., smaller quantities of a compatible, surface active emulsifying agent may be utilized, if such emulsifying agent be desired.

While my afore-mentioned prior applications disclose the dispersing of carbon black only in the monomeric material prior to the formation of the emulsion, it has been found that by suitable procedure the black may be dispersed in an aqueous medium and flushed or caused to migrate from the aqueous medium into the monomeric material. In this way dispersing agents which are only effective in aqueous medium (water-soluble) may be used to facilitate breakdown of the carbon black agglomerates. Thus for example, dispersing agents such as the condensation product of formaldehyde and naphthalene sulfonic acid, water-soluble lignin sulfonates, quebracho, tannins and other agents recognized to have dispersing properties in aqueous solution, and which are highly effective in producing dispersions in water, may be utilized.

When carbon black is simply added to a container containing undispersed hydrocarbons or polymerizable material, the carbon black will enter the hydrocarbon phase even though it was previously wetted by water. However, if an emulsifying agent or an agent of the type adapted to emulsify or disperse in water is present in effective amount, the carbon black is merely retained in the continuous phase and will not enter into the dispersed globules of hydrocarbon or gasoline. Thus, if gasoline is shaken with an aqueous dispersion of carbon black having for example a condensation product of naphthalene sulfonic acid and formaldehyde as the water-soluble dispersing agent, the carbon black remains in the aqueous phase and the oil phase remains clear.

Only when the emulsion is so unstable or when means is provided for causing agglomeration of the droplets of monomer or reversal of phase of the emulsified hydrocarbon do appreciable amounts of the carbon black migrate from the aqueous phase into the dispersed globules to form an oil-in-water type of emulsion having black in the dispersed globules of monomer. One must therefore, after such a "flushing action" incorporate additional emulsifying agent or additional hydrophilic type of protective colloid in the mix to cause another reversal of phase, so that the carbon black is retained in the disperse or discontinuous phase of polymerizable material.

Thus, in accordance with the improvements herein set forth, the carbon black may be dispersed in water in the presence of a suitable dispersing agent having dispersing properties in aqueous media, e. g. Daxad, which is a condensation product of naphthalene sulfonic acid and formaldehyde, or other dispersing agents listed in the above-designated lists of surface active agents in "Industrial and Engineering Chemistry," as well as in the monomer prior to emulsification, as set forth in my prior applications.

The dispersion may be prepared with or without the aid of a ball mill, colloid mill, ultrasonics, or other suitable dispersing means. In preparing dispersion of carbon black in polymerizable material by the flushing action, such material, which preferably contains an antiagglomerating agent, as the afore-mentioned lecithin, asphalt, etc., and a thickener or resinlike material dissolved or dispersed therein, is mixed with the aqueous carbon black dispersion and caused to flush into the polymerizable material or monomer. This is accomplished either by: rendering the dispersion sufficiently unstable, as by the addition of barium chloride or other electrolytes thereto; utilizing as a dispersing agent for the carbon black in water an agent having dispersing properties but having only weak or no emulsifying properties; or by subjecting the aqueous dispersion of black containing the monomer emulsified or mixed therein to a high shearing or frictional treatment, as by passing between relatively moving, closely adjacent surfaces, such for example as passing through a ball mill or a colloid mill to produce the reversal of phase.

If the water-soluble dispersing agent for the carbon black does not have sufficiently good emulsifying properties, i. e. sufficient to maintain an oil-in-water emulsion, a water-in-oil type of emulsion will occur and the black will then flush from the aqueous phase into the monomeric phase. To form the desired oil-in-water type of emulsion required to obtain the major benefits of emulsion polymerization, additional emulsifying agents may be added to the water-in-oil carbon black emulsion and this mixture agitated by convenient means, such for example as by passage through a colloid mill. The resultant emulsion having carbon black within the dispersed globules of monomer is then substantially identical with that prepared by dispersing the carbon black in the monomer and emulsifying the monomer-carbon black mix in a solution of dispersing agent in water or other vehicle immiscible with the monomer. The emulsion is incorporated in suitable polymerizing apparatus and polymerized. The polymerization vessel is preferably one which is substantially completely filled with liquid, as a continuous polymerization apparatus where appreciable vaporization and condensation, to new droplets (reflux action) cannot occur due to absence of appreciable vapor space above the emulsion.

The antiagglomerating or carbon black-dispersing agent is exceptionally important in cases where the black is flushed from the aqueous phase to the monomeric phase as mentioned above. This is evidently for the reason that the hydrocarbon-water interface has excessive tendency to cause agglomeration or aggregation of the carbon particles and agglomerates are formed unless the carbon particles pass rapidly through this interface, with the aid of the antiagglomerating agents, which probably cause improved wetting of the black. By the addition of the antiagglomerating agent, the selective wetting of the black and the hydrocarbon is improved to such an extent that the black appears to pass through the interface too rapidly to produce an undue number of agglomerates.

For most satisfying flushing in the monomer with the least tendency for agglomeration of the once dispersed black in passing through the water-monomer interface, agents imparting to the monomer the greatest tendency for wetting of the black should be used in the monomer and agents having dispersing properties but having the lowest emulsifying properties and lowest tendency to improve the wetting of the black by the water appear to be most desirable.

Thus, short chain alkylanolamines such as triethanolamine or other agents including water soluble amines which have dispersing properties for carbon black in aqueous solution, but which have substantially no emulsifying properties without further treatment, as by the addition of a long chain fatty acid or the like, may be used to prepare the aqueous carbon black dispersions. Simple stirring of the monomer or other polymerizable organic fluid, which preferably contains an antiagglomerating agent and a thickener, as aforementioned, with such aqueous dispersion will usually cause a reversal of phase and resultant flushing of the black from the water. By subsequent addition of a wetting or emulsifying agent, or by treatment of the dispersing agent to produce a powerful emulsifying agent (in the case of triethanolamine by the addition of a long chain fatty acid) reinversion of phase may be had to produce the desired oil-in-water emulsion having black dispersed within the globules thereof.

It is preferred to prevent reagglomeration of the black during the flushing step so that a dispersion of the monomer results without further treatment. However, due to the fact that carbon black once dispersed appears to be more readily dispersed again if it has not been permitted to dry or cake during intermediate periods, preparation of dispersions in the polymerizable material may be prepared by another alternate method, which comprises dispersing the carbon black in water or other fluid immiscible with the monomer; treating the dispersion to neutralize or negative the oil-in-water type of emulsifying and/or dispersing effects of the water-soluble dispersing agent so as to permit the formation of soft carbon black agglomerates; causing the agglomerates to flush into the polymerizable material such as the monomer by shaking with the monomer or otherwise intimately contacting the monomer with the immiscible fluid containing such agglomerates; and subjecting the monomer-carbon black mix thus obtained, preferably after separating the aqueous fluid therefrom, to a suitable dispersing treatment, such for example as obtained by grinding the mix in a ball mill, roller mill or colloid mill. The latter dispersing treatment is preferably in the presence of a substantial quantity of antiagglomerating agent in the monomer.

The carbon black dispersion thus produced is then emulsified in aqueous fluid containing one or more emulsifying agents and/or a protective colloid to maintain an oil-in-water type of emulsion and polymerized.

The amount of finely divided carbon suitably dispersed in the disperse phase of the emulsion of polymerizable material is sufficient to effect an appreciable improvement in the properties of the rubbery polymer produced. The carbon black may be of any desirable type, including gas blacks, channel blacks, furnace blacks, lamp blacks and the like, as recognized in the rubber art to give the properties desired.

The amount of reinforcement or improvement of the rubbery polymer is usually increased when the amount of carbon black is increased until maximum improvement is obtained. No substantial reinforcement of the polymer is usually had until more than 10% of black (based on the polymer) is present and about 15% or more of carbon black is generally required for most polymerizable material. 20% to 40% is usually desirable and as much as 50% or 60%, or even more, of carbon black may be desirable for certain rubbery polymers. In tread rubber compounds about 35% to 60% (based on the elastomer or rubbery material) is generally most desirable.

The amount of black readily dispersible in the polymerizable material, such as a monomer, varies with the type of black and is greater in the case of blacks having low oil-adsorption values and relatively high amounts of volatile matter. Dispersions of necessary fluidity with as much as 40 or 50% in the initial monomer are obtainable.

While I have obtained desirable reinforced rubbery polymers by polymerization in polymerizing apparatus having vapor or air space above the emulsion, it appears that the carbon black is not always uniformly distributed through all the globules of rubbery polymer formed. Superior distribution appears to be present in rubbery polymers formed in polymerizers completely filled with the aqueous emulsion and under elevated pressures, which are at least sufficient to prevent vaporization of the monomeric material at the desirable polymerizing temperature. Higher pressures, even pressures substantially above 500 pounds per square inch, are advantageous, sometimes preferred, particularly in continuous polymerization processes; with higher polymerizing pressures may be obtained faster polymerization rates.

The reactor may be a simple conventional vat-type polymerizer having means for agitation and means for maintaining the desired pressure. But a continuous polymerization system, such as set forth in the accompanying drawings, is preferred. A completely filled polymerizer or a system having no vapor space above the emulsion effectively reduces tendency for reflux action and formation of new globules of polymerizable material. The result is that the carbon black is better distributed in the polymer as formed; also, activated molecules of monomer are retained in the globules to cause more rapid growth of polymer throughout the polymerizable globules.

When refluxing is permitted or when sufficiently low pressure is had, local heating of the globules may tend to cause separation of some of the monomer therefrom, with the result that new globules of polymerizable material may be formed. Such new globules may be required to undergo a new induction period before appreciable polymerization occurs. This latter theory is evidenced to some extent by the fact that polymerization under conditions where refluxing of the polymerizable material is substantially prevented, as when high pressure polymerization in a completely filled closed system is had, is usually at a somewhat faster rate.

Referring more particularly to the drawing, in which like parts are indicated by like numerals of reference throughout the several views, the monomeric material may be incorporated in a monomer supply tank 1, which is adapted to maintain the monomer under liquefying pressure. The material may be a mixture of one or more of the monomeric materials to be polymerized in forming the rubbery polymer. If the monomer contains more than one ingredient, such for example as butadiene and styrene, and/or other unsaturated resin-forming copolymerizable materials, the ingredients may be supplied from suitable sources (not shown) through valves 2 and 3.

Figures 1, 2:
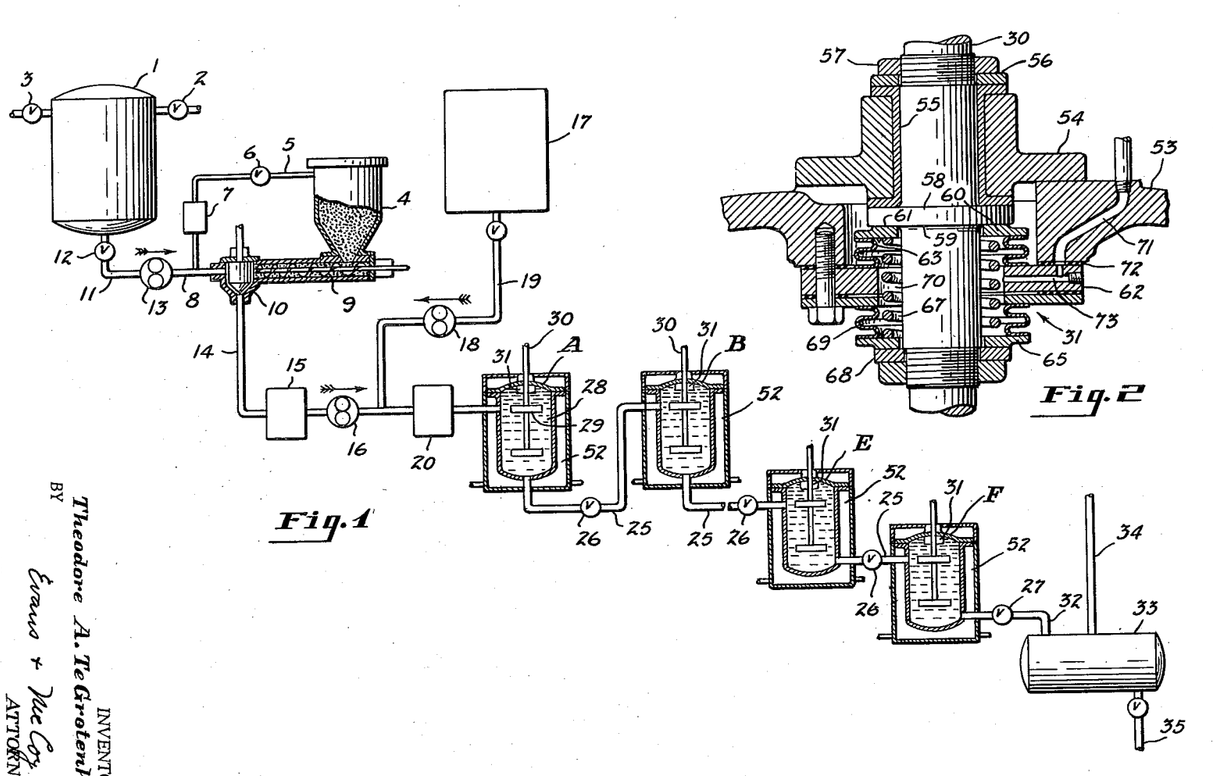
Figure 1 is a schematic view of a continuous polymerization system having a series of units of large volume connected in series through interposed, relatively restricted openings and showing means for forming an emulsion containing carbon black within the separate globules.
Fig. 2 is an elevational view, partly in section, of a suitable seal having a fluid space for receiving liquid under higher pressure than the liquid within the polymerization vessels, so as to effectively prevent polymer or polymerizable material from binding the relatively moving parts.

Carbon black, finely divided carbon, or other reinforcing pigment may be stored in a pressure vessel 4. The pressure vessel 4 is maintained under the pressure applied to the monomer because of connection through a pipe 5, a valve 6 and a liquid trap 7, which connects to the monomer line 8. The black is fed by suitable metering means, such as a rotating screw 9, rotated by connection to a suitable source (not shown) to a mixing chamber 10 having a high speed close fitting rotor. In the premixing chamber 10 the carbon black is combined with the monomer from tank 1 which passes through an exit pipe 11, a valve 12 and a metering or proportioning pump 13. The slurry of carbon black and monomer at exit 14 of the mixing chamber 10 contains the desired proportions of these materials.

The monomer preferably also contains an antiagglomerating agent, as mentioned and defined above. The slurry passing through pipe 14 from the mixing chamber 10 enters suitable dispersing apparatus 15, such for example as a colloid mill, pebble mill, ball mill, roller mill, paint mill, or the equivalent. The colloid mill 15 is equipped with suitable shaft seals and cooling means (not shown) to permit treatment of the monomer-carbon black slurry in a liquid condition, causing formation of an improved dispersion of black within the monomeric polymerizable liquid.

The fluid monomeric material containing the carbon black dispersed therein may be passed from the dispersing apparatus 15 through a metering pressure pump 16 into contact with a stream from tank 17 of aqueous fluid (or any other fluid immiscible with the monomer, such as glycol, glycerine, etc.) containing one or more emulsifying agents and/or a protective colloid in sufficient amount to maintain an oil-in-water type of emulsion. Such fluid is pumped from tank 17 through a metering pressure pump 18 and a pipe 19. The pumps 16 and 18 are regulated so that the proportions of the aqueous fluid and polymerizable material containing dispersed black are those desired for the emulsion polymerization.

The mixture of fluids from the pumps 16 and 18 is preferably passed through suitable emulsifying or homogenizing apparatus, such as a colloid mill or homogenizer 20, at high pressure into the polymerizing apparatus. The polymerizing apparatus comprises a plurality of tanks A, B, E, F, etc. which are connected in series, in the relationship shown, through connecting pipes 25. The pipes 25 preferably connect the bottom portion of the preceding tank with the top portion of the succeeding tank, although other connections may be used. Valves 26 are preferably provided between the successive tanks. Such valves in normal operation are retained in the completely open condition to permit substantially free flow through the pipes 25. Means, such as a valve 27 in exit 32 of the last tank F of the series, is preferably provided for restricting flow through the system so that the unit tanks A, B, etc. are retained completely filled with liquid and without any vapor or air space over the emulsion 28 therein.

The tanks A, B, etc. may be provided with closable vent means (not shown) at the top thereof to permit initial complete filling of the system with liquid as one important aspect of the preferred system stems from the absence of a vapor space above the liquid. Such elimination of vapor space apparently prevents reflux action, which may result in formation of new polymerizable globules that require an additional induction period. Tendency for forming rubbers having the black more uniformly distributed therethrough is also somewhat greater.

Preferably tanks A, B, etc. are supplied with suitable means for agitation, such as stirrers 29 carried by shafts 30, which shafts may be provided with suitable sealing means 31 to prevent binding thereof. (Suitable non-binding shaft seals are illustrated in Fig. 2.)

The tanks A, B, etc. may be provided with removable heads to facilitate cleaning and with cooling means, such as a jacket space 52, for circulation of cooling or heating fluid therethrough to maintain the desired polymerization temperature.

The number of unit tanks A, B, etc., is preferably relatively large, such as five or ten, or more, so that they may be of relatively small size, say 1 to 100 gallons. Tendency for extreme variation in the amount of polymerization of the different globules of polymer due to difference in polymerization time in the separate tanks is thereby minimized. A number of small tanks enables one to economically utilize pressures above the normal amount of liquefying pressure, and preferably pressures of several hundred pounds, and yet provide substantial volume of polymerized material. By utilizing high pressures and decreasing reflux action by elimination of vapor space, rapid polymerizations are obtainable.

Accessibility is readily had for simple cleaning operations should the emulsion ever become sufficiently unstable to cause pre-coagulation or forming of film over surfaces of the polymerizer. This is especially the case if the tanks are all arranged in cascade relationship (illustrated by tanks E and F in the drawing), with each preceding tank higher or lower than each succeeding tank, so that only a very short pipe 25 is needed for connection between the successive tanks.

The supply and withdrawal of the various ingredients may be regulated so that they are retained within the polymerizing units A to F inclusive, the desired amount of time to obtain the desired degree of polymerization. The latex from the exit 32 is passed into a suitable flash tank 33, which may according to conventional practice include suitable distillation apparatus to remove volatile unpolymerized monomers through a pipe 34. The latex separated from the monomer may pass through a pipe 35 to suitable processing apparatus, such as that adapted for coagulation, or apparatus adapted to produce a powder, or the latex may be used directly with or without further modification in industrial processes to produce reinforced, unmasticated rubber articles.

If in place of the dry carbon black within the pressure vessel 4 an aqueous dispersion of carbon black is used, and if in place of the water within the tank 17 a solution of emulsifying agent is used, and preferably a hydrophilic or protective colloid, similar results may be obtained. The colloid mill 15 acts first as a means for frictionally reversing phases (forming water-in-oil emulsions) and causing flushing of the black from the aqueous liquid, or dispersion within the tank 4 to migrate into the monomer which is then a continuous phase. The emulsifying apparatus 20, plus the addition of additional emulsifying and/or stabilizing agents from the tank 17, causes reinversion of phases with resultant formation of the desirable fluid oil-in-water type of emulsion having carbon black dispersed within the globules of polymerizable monomeric material.

In Fig. 2 is shown a suitable non-binding seal and bearing assembly 31, for use in colloid mills, polymerizers, etc. where a seal at high pressure is desirable. It may have a portion 53 which may be a part of the removable head of the polymerizing vessel or a non-rotating portion of a colloid mill, etc., and which is in leakproof relation with the remainder of the pressure cavity thereof. Removably attached to the portion 53 is a bearing member 54 and a journal 55 to receive the shaft 30 and having thrust bearings 56 to receive the collar 57 attached to the shaft. Attached to the shaft 30 in leakproof or integral relation thereto is a collar 58, preferably of hardened alloy such as nitrided steel or the like. Bearing against the hardened surface 59 of the collar 58 is a sealing element 60, also having a surface portion 61 of suitable wear-resistant alloy, nitrided steel or agglomerated powdered metal-graphite material or porous metal adapted to retain lubricant.

The sealing element 60 is flexibly attached in leakproof relation to a mounting member such as the annular plate 62 by means of suitable flexible metal bellows or diaphragm 63. Spaced from the sealing element 60 and also attached to the mounting member 62 is an annular wear resisting sealing element 65, the wear-resistant sealing face of which is forced by suitable means, such as a spring 67, against a removable collar 68, also carried by the shaft 30 and in leakproof relation therewith. A flexible metal bellows or diaphragm 69 connects the sealing member 65 with the mounting member 62, the parts being arranged and the spring 67 being chosen to provide a substantially leakproof cavity 70. Water or other liquid at higher pressure than the pressure within the polymerizing elements A, B, E, F, or within the pressure cavity of the device utilizing the seal, may be admitted into the cavity 70 by suitable means, such as a conduit 71 in the portion 53 which connects through a suitable opening in a sealing gasket 72 to a passage 73. Due to the higher pressure within the cavity 70, a small amount of liquid may flow between the sealing faces of the relatively movable members 65 and 68 into the polymerizing apparatus. Rubbery material is thereby prevented from coming in contact with such relatively movable tight-fitting faces and scoring or binding of the surfaces by such rubbery material is thereby prevented. The metallic bellows is usually sufficiently rigid to withstand torque but if desired stationary stiffening means such as ears (not shown) on the sealing elements 60 and 65, respectively engaging with the portion 53 and a member rigidly connected to said mounting member for preventing twisting of the bellows, may be readily provided.

Figures 3, 4:
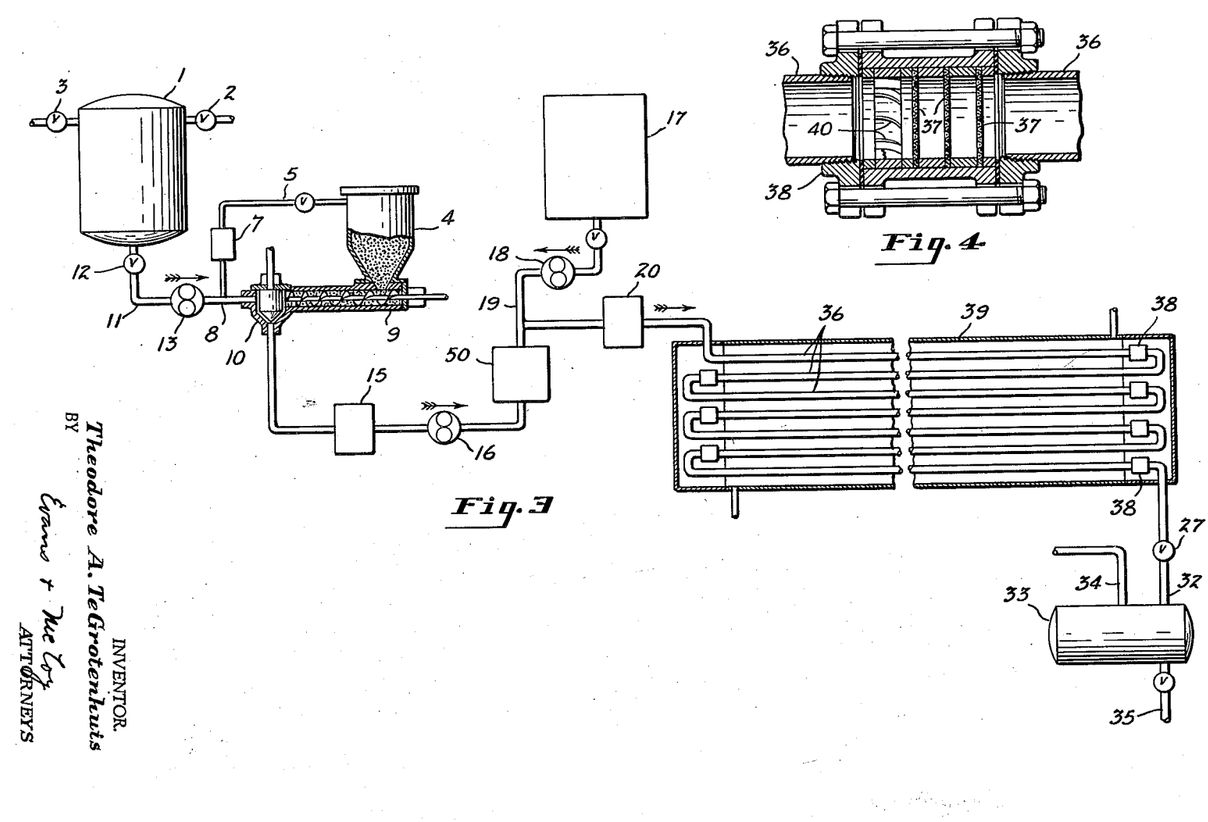
Fig. 3 is a schematic view of modified form of continuous polymerization apparatus and the afore-mentioned emulsifying means.
Fig. 4 is a longitudinal sectional view through means for causing turbulence and insuring maintenance of the emulsion, which means is indicated by the numeral 38 of Fig. 3.

In the apparatus shown in Fig. 3, the tanks A, B, E and F are substituted by pipes 36 connected in series and retained within a suitable water jacket or temperature-controlling bath 39. The use of pipes 36 also permits elimination of undesirable reflux action and is preferable if it is desired to preventing mixing of polymerizable material in different degrees of polymerization. Such mixing sometimes is advantageous, however, in accelerating polymerization.

With pipes 36 connected in series relationship, difficulty is sometimes experienced due to precoagulation of the latex provided the latex is not sufficiently stable. Sufficient emulsion-stabilizing agents should therefore preferably be present. Means 38 for producing turbulence and comprising a plurality of spaced screens 37 with vanes 40 may be periodically disposed in spaced relationship along the series of pipes 36 to provide increased agitation of the polymer and to break up any unemulsified masses of polymerizable liquid.

In Fig. 3 the monomeric liquid is also metered by the pump 13 into suitable means 15 for forming a dispersion of the desired concentration of black in monomer. In place of or in conjunction with the black, other pigments such as zinc oxide, with or without softeners may be used. The dispersion of black in the monomer may then be passed, if desired, as shown in Fig. 1 through the pumps 16 into a partial polymerizing means, such as a coil or tank 50, which may be maintained at a desirable polymerizing temperature by means not shown, to thicken or slightly polymerize the material in mass form. A suitable catalyst, such for example as a Friedel-Crafts catalyst, including boron trifluoride, metallic sodium, sodium amalgum, etc. or others operable in the absence of water, may be present in the partial polymerizer 50. The liquid partial polymer containing the black is then passed into contact with aqueous fluid containing the desired amounts of emulsifying agent, catalyst, activator, protective colloid and emulsifier, emerging from the pipe 19 into the emulsifier or homogenizer 20 where the desired emulsion is formed. If it is not desired to partially polymerize the monomer in mass prior to the emulsification step, the partial polymerization means 50 may be eliminated.

The monomer is as afore-mentioned maintained throughout under pressure at least sufficient to maintain liquid form. The temperature is preferably chosen to give the desired polymerization rate.

The emulsion polymer containing the finely divided carbon within the separate globules may be coagulated with or without prior admixture into the aqueous dispersion or latex of desired compounding agents and the coagulated mass utilized in accordance with the usual masticating and shaping procedures to produce, when vulcanized, articles having greatly superior properties to those having carbon black simply added to and masticated in the coagulated polymer in accordance with ordinary practice.

It is generally preferred, however, that the finely divided polymer of the present invention be utilized without any substantial mastication. This may be accomplished by incorporating in the latex of the reinforced rubbery polymer, compounding and vulcanizing agents in the form of emulsions or dispersions. The material then compounded, may then be gelled and shaped to the desired form. This is similar to methods used in natural latex technology.

Since the polymers produced from a major portion of conjugated diene and one or more hard resin-forming copolymerizable ingredients usually have a relatively small amount of tack and may not always readily adhere together, it is frequently desirable, when the agglomeration in shaped from is to take place directly from the latex, to incorporate in the latex prior to the agglomerating step an emulsion of a plasticizer, solvent, rubber cement, or even a syrupy or highly plastic partial polymer of polymerizable materials, such for example as a partially polymerized diene including isoprene, butadiene and, chloroprene, an acrylic or methacrylic ester, vinyl acetate, a fumaric ester or other unsaturated polymerizable ester, styrene, acrylonitrile, etc., or copolymers from materials containing a diene and one or more of the above or similar ingredients. During agglomeration, the particles of the plasticizing or incompletely polymerized material may be precipitated in admixture with the particles of the rubberlike polymer to modify them to improve adhesion.

The direct use of an aqueous dispersion of rubber is undesirable in many commercial processes because of the presence of the water, removal of which causes much shrinkage in the product and may even result in porosities. In accordance with the preferred process of the present invention, the rubberlike material with the carbon black dispersed therein is prepared in the form of a dry powder, which may be further mixed with additional compounding agents and formed by means of heat and pressure into a coherent mass of reinforced rubberlike material having the desired shape.

The finely divided powder may be obtained by methods analogous to those used in the preparation of natural rubber powders, such for example as are described in the Merrill Patent No. 2,289,672, Stam Patent No. 2,009,531, or the Noble Patent No. 2,019,055.

Thus, the powder may be prepared by spraying the latex, which preferably contains a protective colloid, such as 5% or 10% of dextrine, glue, an ammoniacal zinc phosphate-protein mixture, or a hydrophilic gum, gelatine, starch, etc., in a heated chamber to cause sudden removal of the water from the atomized material. A dispersion of a relatively small amount of carbon black may also be added to the latex to assist the dextrine, glue, etc. in retaining a non-adherent coating over the interface of the particles of the polymer. The powder may also be formed in accordance with the procedures analogous to those disclosed in the Merrill patent and Noble patent, above-mentioned. Thus, the latex containing the dispersed carbon black, to which latex was first added an insolubilizable hydrophilic stabilizer, such as casein, soaps, etc., may be flocculated by addition of metallic salt, such as barium chloride, zinc chloride, etc., and the flocs granulated just after a firm crumbly cake is formed. A dispersion of carbon black may also be added to the latex before or after flocculation if desired in order that a small amount of the carbon black may be present between the interfaces of the powder thus formed to assist in maintaining discrete particles as above-mentioned.

A desirable powder may also be prepared by first freezing the latex containing carbon black dispersed within the rubberlike globules thereof and then granulating the friable crumbly mass. These particles may then be washed and dried in suitable manner to form a dry powder.

In the preparation of useful articles from the powders of the vulcanizable rubberlike polymers containing substantial amounts of carbon black dispersed within the individual particles thereof, the desired compounding agents, such as vulcanizing agents including sulfur, selenium and tellurium, and vulcanizing-type accelerators, accelerators and antioxidants, which may not have been previously incorporated in the latex prior to the formation of the powder, may be intimately mixed with the powder as by simple stirring. The powdered mixture thus produced may be incorporated in a suitable mold or formed under conditions such that the rubber particles will coalesce and the composite mass cured or vulcanized. The particles of polymer containing large amounts of carbon black have relatively low adhesive tendencies, especially when they have a non-tacky coating or adhesion preventive on their surfaces, as is usually the case.

Simple compression of the powdery mixture in the usual type of cavity mold will not in general cause the formation of a composite article having all the separate particles of powdered polymer strongly adhered together, even though very high pressures are used. This is particularly true with the copolymers of diene hydrocarbons and hard or tough elastomers and when the amount of carbon black is more than 30 or 40%, based on the rubberlike polymer, and also when the surface coating is not heat-plastic or absorbed by the rubberlike material when heated at vulcanizing temperatures. When the compounded powdery material is disposed in the usual open mold and an attempt is made to form a mixture by simply compacting the material together, it is usually found that except for an outer layer or skin over the surface of the article, the particles do not agglomerate.

The difficulty of adhesion between the particles of the powdery polymer may be substantially entirely overcome by forcing the material with high pressure through small heated openings as when an injection-type mold is used, wherein the powdery mixture is forced through one or more relatively small openings or orifices into the mold cavity. The small openings or passages apparently subject the surface of the particles to a shearing action, breaking up the surface coating and exposing a clean surface for adhesion to other particles before they enter the mold cavity. Where the stock is to be extruded, as in making tire treads, the material may be forced through a large number of small openings into a forming die or chamber to shape the tread stock.

The difficulty of adhesion between particles may also be overcome by mixing a substantial amount of suitable plasticizer or solvent with the particles so that the tackiness of their surfaces is increased and the tendency for adherence between the particles of rubberlike polymer is increased. The plasticizer preferably used consists in part at least of a material which is also polymerizable into a rubberlike polymer, so that the rubbery material is not deteriorated by the solvent. Thus, especially desirable plasticizers include a soft plastic or even a syrupy partial polymer of butadiene or other conjugated dienes, monomeric or partially polymerized chloroprene, haloprene or cyanoprene, and mixtures of such conjugated diene materials with copolymerizable ingredients, with or without a substantial amount of intimately mixed carbon black. If such a polymerizable plasticizer is used, it is preferred that the normally gaseous monomeric materials be first removed, so that the syrup, while flowable, has greater viscosity and considerably higher boiling temperature than monomeric materials.

The present invention is primarily applicable to the preparation of rubber articles from synthetic rubbers of the types which are substantially reinforced or have their tensile strength increased by carbon black when the latter is masticated therein. This invention is also applicable to other elastomers, particularly vulcanizable synthetic elastomers as defined in the article by H. L. Fisher entitled, "Nomenclature of Synthetic Rubbers," vol. 100, No. 6, India Rubber World, September 1939. These rubbers may be polymers of butadiene, or homologues and analogues thereof, including chloroprene, isoprene, dimethyl butadiene and other materials containing conjugated unsaturated linkage such as double bonds, and preferably having 4 to 8 carbon atoms. But I usually prefer copolymers of one or more such dienes, particularly butadiene and/or isoprene, with one or more other polymerizable materials, especially those containing a single aliphatic olefin group including vinyl derivatives, vinyl pyridine and vinyl chloroacetate, styrene, halogenated styrenes including nuclear chlor-substituted styrenes, alphaalkylstyrols, acrylates, acrylic nitrile, methacrylic esters, acrylic methyl esters, dimethylvinylethynylcarbinol, etc., and even much lower olefins as isobutylene. Other materials, including methacrylyl urea, vinyl ketones, substituted vinyl ketones, unsaturated low molecular weight acids, such as fumaric acid, their esters and amides, mixtures of vinyl amide and phthalic anhydride or vinyl phthalamide, etc. may also be present to modify the properties of the polymer. The dienes are in most instances at least 40% and preferably 50% or more of the material to be polymerized.

Although chloroprene polymers are not usually reinforcible by carbon black to cause an increase in strength, where the intimate mixture of black and monomer or partial polymer is prepared in accordance with the method herein described, the carbon black also improves the properties of polychloroprene and other haloprenes in the same manner as they are improved by mastication with carbon black.

In most instances it is desirable to polymerize the intimate mixture of carbon black and polymerizable material in the finely subdivided state, as by emulsion polymerization, until the rubbery polymer is produced having carbon black within the separate globules thereof. In a modified procedure, however, the viscous mixture of polymerizable material and dispersed carbon black may be polymerized in a continuous phase or discontinuous phase to an advanced degree but incorporated in a mold before the crude rubber-like state is reached, polymerization being completed in the mold or forming chamber, usually with the application of heat and high pressure, which is preferably as high as several hundred atmospheres or more to counteract shrinkage and to accelerate the rate of polymerization. The pre-polymerization may or may not be in the finely divided state and the desired vulcanizing agents and accelerators may be mixed with the polymerizable material any time prior to incorporation in the forming mold.

The following examples, in which the parts are by weight, illustrate the invention:

Example 1

120 parts isoprene
40 parts styrene
45 parts carbon black[1]
15 parts oil-soluble soya lecithin
8 parts pale crepe rubber
14 parts triethanolamine oleate
320 parts 5% aqueous methyl cellulose solution
.3 part $K_3Fe(CN)_6$
3.5 parts tertiary butyl hydrogen peroxide

[1] A special ink grade of black made by roller process.

The carbon black, pale crepe rubber, styrene and lecithin were rolled together on a relatively close-fitting rubber mill, forming a very stiff puttylike paste. Rolling of the stiff paste served to break up the carbon black agglomerates. The paste thus formed was stirred with the isoprene until substantially complete dispersion of the black took place and the polymerizable material had a creamy consistency. The dispersion of black and monomer thus prepared was then violently stirred with the methyl cellulose solution containing the soap and the rough mixture was passed through a colloid mill three or four times to obtain a smooth oil-in-water type of emulsion. The emulsion was incorporated in a batch-type polymerizing vessel to which the peroxide and ferricyanide were added just before sealing. The material was polymerized with agitation until the polymerization progressed to a yield of 72%.

A portion of the latex containing the black within the globules of rubber when coagulated, washed, dried and mixed with compounding agents other than black had a tensile strength of about 1900 pounds per square inch and was extremely resilient, indicating very low heat build-up.

When 45 parts of the same carbon black were milled into a standard GR-S (Buna S) rubber (considered far superior to isoprene-styrene polymers) or when 45 parts of the same black were incorporated as a dispersion into a standard GR-S latex to produce after mastication masses having 45% of the black, based on the GR-S, and the mix compounded in conventional manner by the addition of compounding agents other than black, the tensile strength of the cured rubber-black mixture was considerably less than 1000 pounds per square inch.

Example 2

112.5 parts isoprene
37.5 parts styrene (containing about 2 parts of polystyrene)
27.5 parts Peerless Black
15 parts triethanolamine
12.5 parts oleic acid
10 parts soya lecithin (hydrocarbon-soluble)
.3 part $K_3Fe(CN)_6$
300 parts water
9 parts methyl cellulose
3 parts tertiary butyl hydrogen peroxide The carbon black was ground in a ball mill for about thirty-six hours with the triethanolamine and about one-half of the water, the triethanolamine serving as a dispersing agent in water. The isoprene and styrene containing the lecithin dissolved therein were then stirred with the carbon black dispersion until a reversal of phase and flushing of the carbon black into the polymerizable material took place. The oleic acid and methyl cellulose dissolved in the remainder of the water were then shaken with this mixture to form with the triethanolamine a strong emulsifying agent and to cause reinversion of phases or formation of an oil-in-water type of emulsion. This emulsion, together with catalyst and ferricyanide, was then incorporated in the polymerizer and agitated at 40 degrees until the yield of rubberlike material was about 60%.

The rubber when coagulated and mixed according to conventional procedure, but without addition of any extra black, when cured had a tensile strength of about 1975 pounds per square inch and an exceptional snap and rebound.

Example 3

125 parts isoprene
45 parts styrene
45 parts carbon black (roller process)
10 parts ink lengthener
5 parts pale crepe rubber
5 parts rosin
17 parts casein
340 parts water
5 parts sodium oleate
.8 part sodium hydroxide
.3 part $K_3Fe(CN)_6$
4 parts sodium persulfate The carbon black, styrene, isoprene, ink lengthener, rosin and pale crepe were ground about twenty-four hours in a ball mill to produce a dispersion of black in the monomeric polymerizable material. The dispersion thus produced was then emulsified in the water containing the casein, soap and other ingredients to form a stable oil-in-water emulsion. The material thus formed was polymerized for about eighty hours at 40° C. The latex produced had excellent film-forming properties and cured films formed from the latex mixed with suitable dispersions of compounding agents had high tensile strength and excellent properties.

*Example 4*

125 parts isoprene
45 parts styrene
45 parts carbon black (roller process)
10 parts polyisobutylene
12 parts lecithin
7.5 parts rosin
5 parts sodium oleate
.8 part sodium hydroxide
5 parts Triton-NE
20 parts casein
340 parts water
4 parts tertiary butyl hydrogen peroxide
.5 part dodecyl mercaptan The polyisobutylene, first masticated to promote solubility, was mixed with the carbon black, lecithin, styrene and part of the isoprene. This mixture was incorporated in a ball mill and ground for a few hours to allow intermixing of the carbon black in gellike mixture of monomer and thickener. The additional isoprene was then incorporated to cause further improvement and dispersion and the grinding was continued for several hours. The dispersion thus produced was then emulsified in water containing the casein, soap, alkali and other ingredients to form a stable oil-in-water emulsion. The material thus formed was polymerized until the conversion of monomer was above 65%.

The latex produced had good film-forming properties and the tensile strength of vulcanized rubber articles produced therefrom showed substantial reinforcement to have been effected by the black.

*Example 5*

Latex produced as in any of the preceding examples is spray dried or otherwise dewatered to produce a dry powder that is readily maintained in discrete particles. The powder thus obtained is stirred with about 2% of finely powdered sulfur, about 1% of accelerator, and about 5% of zinc oxide to produce a uniform powdery mix. The powdery mix thus obtained is extruded by high pressure through fine openings into a forming chamber or mold, where it is cured and vulcanized to an article having exceptionally high abrasion resistance due to its unbroken-down molecular structure.

*Example 6*

Latex prepared in accordance with Example 4 having carbon black within the globules of rubberlike material is mixed with an aqueous dispersion of carbon black to provide about 5% carbon black and about 2% sulfur, based on the rubbery material. The mixture is then atomized and dried in atomized form to produce separate globules having carbon black at the interface thereof. The dry powdered rubbery material thus obtained is stirred with the suitable amounts of powdered compounding and curing agents and with a small amount of a syrup or soft polymer obtained by polymerizing about 75 parts of butadiene and 25 parts of styrene to a relatively non-volatile liquid or semi-solid state. The amount of syrup used is only sufficient to coat or plasticize the surfaces of the finely divided rubberlike materials and thus produce a heterogeneous mix having a continuous phase of highly plastic material over the solid rubbery particles. The heterogeneous mix thus prepared is forced by high pressure rapidly through small openings into the cavity of an injection mold, where polymerization of a portion of the plastic material and curing of the rubbery polymer takes place.

When the article is cut and the interior examined, it is found to be entirely coalesced together in a homogeneous mass, this apparently being partly due to the shearing effect of the small passages into the cavity of the mold.

When in the above example a dispersion of sulfur and preferably a small amount of a dispersion of suitable accelerator is also mixed with the latex prior to the spray drying to produce a powder therefrom, a slight cure may be imparted to the powdered rubberlike material. A powder thus prepared when masticated into a matrix compound of natural rubber or other rubbery material, which is preferably plasticized with a syrupy or soft partial polymer (preferably of the same type of monomer as those from which the powder was produced), gives an especially wear-resistant heterogeneous compound suitable for tire treads. A somewhat similar compound may be prepared by mixing a latex such as above prepared with black in the monomer (which may or may not be partially or wholly cured) with a compounded latex of natural rubber or other rubbery polymer and coagulating and partially drying the coagulum.

*Example 7*

A metal member coated with a rubber-to-metal adhesive such as the solution of a heat reaction product, prepared according to the Griffith Patent No. 2,340,321, of a thinly sheeted Hevea rubber mix containing a salt of a strong acid, water and a weak acid, is incorporated in the desired position in the cavity of an injection-type mold. Either of the compounded powdery mixtures of rubbery polymers set forth in the preceding examples is introduced through the relatively fine openings into the cavity of the molds in such quantity as to completely fill the cavity. The mold is heated at vulcanizing temperatures to vulcanize the rubberlike material, pressure being retained on the rubbery material during the vulcanizing period.

The article removed from the mold is found to be firmly bonded to the metal and to be reinforced in tensile strength. Other rubber-to-metal adhesives may be substituted for the rubber conversion product of the above-mentioned Griffith patent.

*Example 8*

125 parts butadiene
40 parts styrene
5 parts isoprene
5 parts dimetyl vinyl ethynylcarbinol
10 parts pale crepe
45 parts carbon black (roller process)
10 parts hard asphalt (similar to gilsonite)
7.5 parts rosin
5 parts sodium oleate
.8 part sodium hydroxide
20 parts ammonium caseinate
340 parts water
.5 part dodecyl mercaptan
.6 part potassium persulfate
.5 part formaldehyde (40% aqueous solution)

The pale crepe rubber, softened with the isoprene and styrene, together with the butadiene, carbon black, asphalt and rosin are ground in a pebble mill for twenty-four hours under liquefying pressure to a dispersion or intimate mixture of black in the monomer. Without reducing the pressure, the ingredients are incorporated in a closed container containing the aqueous alkaline casein solution together with the sodium oleate, hydroxide, catalyst, mercaptan and formaldehyde. The amounts of the ingredients are such as to completely fill the container without permitting a vapor space above the emulsion. The ingredients are agitated at about 40° F., maintaining pressure of over 100 pounds per square inch until polymerization progresses to about 80%. The rubbery latex containing carbon black dispersed therein is spray dried in a suitable manner to produce a finely divided powder. When the powder thus obtained is masticated into a more plastic matrix, consisting of masticated Hevea rubber compounded with carbon black and suitable vulcanizing and plasticizing agents, a heterogeneous compound having the synthetic rubber dispersed within the natural rubber compound, that serves as a binding ingredient therefor, is formed. The heterogeneous compound thus produced may be readily tubed and shaped according to conventional practice and when utilized as tire treads produces tires of exceptional abrasion resistance.

When 2-vinyl pyridine is substituted for dimethyl vinyl ethynylcarbinol in this example, substantially the same results are obtained.

*Example 9*

775 grams of channel carbon black are mixed with about 1550 grams of water containing 77.5 grams of Chemical-PW (disodium form of the condensation product of formaldehyde and naphthalene sulfonic acid). After the carbon black is thoroughly wetted, the mixture is dispersed by grinding several hours in a pebble mill. The resulting dispersion, containing about 33% of carbon black, is placed in a suitable vessel and diluted with about eight times its volume of water. To the diluted carbon black dispersion is added, with agitation, about 100 grams of barium chloride to flocculate the carbon black and to precipitate the dispersing agent. If desired, a small amount of a wetting agent, such for example as Turkey red oil, may be present in the dispersion to assist in controlling particle size of the flocculated particles.

Any excess barium chloride may be precipitated by the addition of a small amount of powdered alum and the resulting aluminum chloride precipitated by the addition of an excess of sodium carbonate to give a pH of about 7.

A sufficient amount of the suspension of the loosely agglomerated carbon black may be shaken in a pressure vessel with the polymerizable hydrocarbons, containing asphalt or other suitable antiagglomerating agent, to cause flushing of the carbon into the monomeric material.

Excess water is separated from the monomer-carbon black mix and the resulting mix incorporated in a ball mill, where it is ground for a few hours to cause dispersion of the loosely agglomerated black particles in the monomer.

The amounts of the flocculated black and monomer shaken together were selected to give in the monomer about 20 to 30% of black. The resulting dispersion was then emulsified in an aqueous phase similar to that of Example 8 to cause the formation of a stable oil-in-water emulsion, which is incorporated in a closed vessel and polymerized to produce a rubbery polymer.

*Example 10*

75 parts butadiene
5 parts isoprene
20 parts styrene
10 parts asphalt
8 parts rubbery isobutylene polymer
200 parts water
7.5 parts cetyl trimethyl ammonium bromide (80% alkaline solution)
1.15 parts pinene mercaptan solution
.3 part potassium persulfate
3 parts acetic acid
5 parts gelatine (acid-stable)
30 parts carbon black (roller process)

The masticated rubbery isobutylene polymer is dissolved in the butadiene, isoprene and styrene. These ingredients, together with the asphalt and carbon black, are ground in a ball mill for forty-eight hours to produce a dispersion of black in the polymerizable materials. The dispersion thus produced, while always maintaining liquefying pressure, is emulsified in the water, containing emulsifying agent, gelatine, catalyst, mercaptan and the acid, which provides a pH of about 3.9. The polymerization is carried out under agitation at about 40° C. in a polymerizing vessel substantially completely filled with the liquid phase to reduce tendency for formation of nuclei by reflux action. The temperature and agitation are maintained until the conversion of rubberlike material is about 75%.

The tensile strength and elongation of articles produced from the rubberlike material of the resulting latex is substantially above 3000 pounds per square inch and 600%, respectively.

When in the above example about 5 parts of 2-vinyl pyridine are substituted for the isoprene, the amount of acetic acid is increased to 5 parts and the carbon black is substituted by a higher, more strongly reinforcing carbon black. The tensile strength and modulus of the rubber are somewhat higher, but the elongation is generally somewhat less.

When a latex having the black within the unmasticated rubber globules as in the preceding example is compounded with an accelerator, such as a dispersion of one part of butyl zimate or other suitable vulcanization accelerator and preferably a compatible emulsion of solvent, oil or partial polymer to act as a plasticizer or tackifier therefor, and the resulting aqueous mixture beaten into the froth and the froth mixed with a dispersion of 5 parts of zinc oxide or other activator, gelled and cured in a mold by suitable means as by passage of a strong alternating current therethrough, a sponge rubber article of desirable characteristics may be obtained. It is often desirable to mix one or more of the synthetic latices with a compatible natural latex, the latter serving as the tackifier in place of part or all of the solvent. Both of the latices should be of the acid stable variety (positively charged) or both should be of the alkaline (negative charged) variety to be compatible. Sponge formed from a frothed compounded mixture of natural and one or more synthetic latices has especially desirable characteristics.

Example 11

- 125 parts isoprene
- 45 parts styrene
- 45 parts carbon black (roller process)
- 10 parts ink lengthener
- 5 parts pale crepe rubber
- 5 parts rosin
- 17 parts casein
- 340 parts water
- 5 parts sodium oleate
- .8 part sodium hydroxide
- .3 part $K_3Fe(CN)_6$
- 4 parts sodium persulfate
- 5 parts dispersing agent (naphthalene sulfonic acid-formaldehyde condensation product)

The carbon black is dispersed in one-half of the water containing the dispersing agent dissolved therein by grinding the material together in a ball mill for at least five hours. The aqueous dispersion of black thus produced is then combined with the isoprene and the styrene, which latter contains dissolved therein the ink lengthener, the rubber and the rosin. The rough mixture, which has the appearance of a rough emulsion, is then passed two or three times between the relatively moving closely adjacent shearing surfaces of a colloid mill, whereupon a reversal of phase takes place and a water-in-oil type of emulsion is formed as evidenced by the fact that the resultant mixture is not miscible with water. Carbon black in the reversed emulsion is present in the polymerizable material instead of the water. The water-in-oil emulsion thus formed is then mixed with the remaining water containing the casein, sodium oleate, sodium hydroxide and the mixture again passed through the colloid mill, whereupon reinversion of the emulsion takes place and an oil-in-water type of emulsion, having the carbon black within the globules of polymerizable material, is had. The additional ingredients above mentioned are then incorporated with the mixture and the materials added to a suitable polymerizer equipped for agitation.

The amount of the materials is chosen so that the polymerizer is completely filled with the emulsion and high pressure (100 atmospheres) is applied through a liquid line connected to an external source of high pressure to prevent vaporization throughout the polymerization period. After maintaining the emulsion at about 50° C. for several hours, a rubbery latex having excellent film-forming properties and having the carbon black dispersed within the globules thereof is formed. Articles produced without mastication from the latex produced have relatively high strength and excellent resilience.

In the above examples other pigments and even softening agents, etc. may be incorporated in the emulsion of polymerizable material or dispersed in the monomeric material. Oxides such as zinc oxide, magnesium oxide, titanium oxide and other inorganic pigments tend to counteract the tendency of carbon black for causing phase reversal and thus assist in maintaining oil-in-water emulsions, particularly when they are not too highly dispersed. Such inorganic pigments are therefore desirable and permit some reduction in amounts of emulsifying agent required.

In the preceding examples, the styrene may be substituted in whole, in part, or in excess by one or more chloro styrenes, acrylonitrile, vinyl dimethyl ethynylcarbinol, acrylic and methacrylic acid esters and the like as afore-mentioned provided the thickener used is also varied so as to be soluble in the combination of monomers. The isoprene may be substituted in whole or in part by one or more other conjugated dienes, such as butadiene-1,3, dimethyl butadiene-1,3, chloroprene and the like. The conjugated dienes, which are usually preferably present in any amounts greater than 50% of the polymerizable materials to produce rubbery polymers reinforced by finely divided carbon, may be increased in amounts to replace the copolymerizable material and thus constitute the sole polymerizable ingredient, if desired.

The somewhat faster polymerizations are obtainable by mixtures having more than two polymerizable ingredients. Thus the polymerizable materials having a major proportion of butadiene and minor proportions of several copolymerizable materials, such as the hard resin-forming ingredients above set forth, usually polymerize with greater rapidity than does a single diene or mixtures of a single diene with a single resin-forming material.

The percentage of carbon black and type used in the above examples may be varied as desired to obtain desirable results. The amount of black preferred often depends on the consistency of the monomer black mix which in turn depends as aforementioned largely on the amount and character of both the black and of the antiagglomerating agent.

The lecithin, asphalt and ink lengthener in the above examples may be substituted by other compatible antiagglomerating agents, as above pointed out. The pale crepe rubber or rubbery isobutylene polymer may be substituted by resins, monomer-soluble cellulose ethers, and other thickening materials soluble in the monomer which preferably do not require excessive catalyst to promote polymerization of monomers containing them. The emulsifying agents may be substituted by other emulsifying agents in amounts capable of maintaining an oil-in-water emulsion. Polymerized or polymerizable emulsifying agents such as polyvinyl alcohol, hydrolyzed acrylic or methacrylic esters (polyacrylic alcohols) etc. are especially desirable when a powdered polymer is to be produced or when the latex is used directly.

The polymerization system used in the above examples may be substituted by other polymerization systems as they become known in the art, it being preferred that the antiagglomerating agents being used be compatible with the system as above pointed out. Thus, emulsifying agents suitable for acid systems may be used in place of the sodium oleate and rosin soap. The complex potassium ferricyanide system may be omitted or may be substituted by other systems using complex materials, such for example as .1 to .5% of sodium or potassium cobaltinitrite, or of Erdmann's salt etc. (added with the aqueous alkaline emulsifying solution and in combination with a mercaptan such as pinene or dodecyl mercaptan and preferably excess alkali), as disclosed in the application Serial No. 577,328, filed February 10, 1945, now abandoned, by John C. Warner and Harry Seltz, to obtain considerably faster polymerization. Other systems, such as cobaltus chloride—sodium pyrophosphate—ferric sulfate (or other ferric compound), are known to those skilled in the art and may be used to accelerate polymerization. The oxidizing catalyst may be substituted by other oxidizing type catalysts, etc. and in case an aqueous medium is not present during the polymerization or used as the continuous phase, Friedel-Crafts catalysts, such as $BF_3$, $AlCl_3$, etc. may be used.

The carbon black may be used as a carrier for the catalyst if desired and often with improved results. This is especially the case if the carbon is previously treated to provide a clean surface as by subjecting it to any activation treatment. Such activation may, for example, be had by subjecting the black to super-heated steam, or a highly heated diene vapor to drive off adsorbed gases, and then permitting it to cool in absence of air or contaminating materials other than the desired diene etc. so that good contact with the carbon surfaces may be had.

In addition to the carbon black intimately mixed into monomeric materials and there polymerized so as to be present within the globules of the rubbery material, other carbon black and/or other pigments may be dispersed within or otherwise suitably added to the latex of the rubbery polymer or within the emulsion of polymerizable material or to a mixture of such latex or latices with a natural rubber latex or other latex, so as to be present within the continuous or aqueous phase before or after completion of the polymerization. Upon coagulation of the latex, such black may by slight mastication be used as an additional reinforcing medium.

It will be seen from the above that the present invention comprises the essential steps of forming a dispersion of substantial amounts of carbon black in a material capable of being polymerized into a rubbery polymer, polymerizing the polymerizable material of the dispersion thus formed (preferably in an oil-in-water type emulsion) to the rubbery state to obtain a rubbery polymer, which in the unmasticated state contains carbon black dispersed therethrough.

It will also be seen from the description herein (1) that the dispersion of the black in polymerizable material may be accomplished either by dispersing black in water and flushing it into the monomer by one of the several methods described, or by dispersing black in the unemulsified monomer prior to an emulsifying step; (2) that the retention of black in the polymerizable material is greatly facilitated by the incorporation of a thickening agent and an antiagglomerating agent therein; (3) that the distribution of the black in the monomer is improved when polymerization takes place in the absence of a vapor phase above the emulsion and under sufficiently high pressure to maintain the polymerizable material in liquid form; and (4) that the carbon black tends to act as a phase-reversing material, so that to obtain the benefits of polymerization in an oil-in-water type of emulsion sufficient protective colloid and/or emulsifying agents should preferably be present in the emulsion to prevent reversion to the undesirable water-in-oil type of emulsion.

It is also pointed out above that the antiagglomerating agents and thickening agents that may be used are multitudinous but may be selected for the particular monomer by simple tests. If it be desired to change the emulsifying system, it is also desirable to make a preliminary test to determine whether or not the system is compatible with the antiagglomerating agent used.

By subjecting the carbon black to a shearing treatment in the presence of the polymerizable material good contact may be had between the separate plate-like layers of the carbon black and the polymerizable material so that these plate-like layers may be better utilized.

By forming the polymer with the carbon black thoroughly dispersed therein, the polymer may be compounded with practically no mastication and the usual breakdown of the structure of the rubbery material is thus avoided, so that articles having improved properties may be readily obtained.

Because of the difficulty of cohesion between the rubbery polymers containing carbon black polymerized therein, the forcing through orifices as in injection molding is of particular advantage in that a strong, homogeneous uniform article may be readily prepared from the dry powder. For the same reason, when the latex is utilized directly it is desirable to incorporate in the latices of the present invention another less highly polymerized latex, a natural latex, or other tack-producing material.

It is seen that in accordance with the present invention sufficiently large amounts of carbon black or other suitable pigment are dispersed in the individual particles of a finely divided unmasticated polymer to materially improve the properties of the rubbery composition.

It will also be seen that the results obtainable with the present invention show that the micelle theory of polymerization, which was subscribed to by a large number of those skilled in the art, is incorrect. This theory held that in emulsion polymerization only the small amount of polymerizable material dissolved in the soap solution was activated to start polymerization, and that during the progress of the polymerization all of the polymerizable materials migrated from the original globules thereof to the nuclei thus formed to give particles of rubbery polymer, separate and distinct from the original globules of polymerizable material. The fact that carbon black remains within the globules when introduced therein in accordance with the present invention is in conflict with the micelle theory, since carbon black is obviously insoluble.

The solution of the problem involved in the present invention is independent of the particular rubbery polymer produced and is applicable to an infinite variety of rubbery polymers. Thus, it may be desirable to vary the relative proportions of the polymerizable materials in the monomer or to substitute them by other polymerizable materials as they become available. The proportions and the number of ingredients polymerizable to a rubbery mass may be varied, as will be apparent to those skilled in the art. The present invention applies not only to such polymerizable ingredients as may be known at the present time but also to those which may be hereafter produced that are polymerizable to rubbery polymers. The polymers, however, should be preferably of the type which are vulcanizable either with sulfur or other agents capable of converting the material, with or without heat, from the plastic to the elastic state.

Even with rubbery products produced by condensation, (rubbery condensation polymers) e. g. certain rubbery reaction products of dibasic acid, such as sebacic acid, with glycols, diamines, and the like, the carbon black may be retained in the rubberlike materials by incorporating it in the less water-soluble constitutents in accordance with the procedures above pointed out. In such cases the thickener and anti-agglomerant if used should be non-reactive with the ingredients.

It is thus seen that the term "vulcanizable synthetic rubberlike material" as used herein is, in its broadest scope, entitled to include sulfur-vulcanizable synthetic rubbers as well as other synthetic vulcanizable materials of a rubbery resilience characteristically resembling after vulcanization a soft vulcanized natural rubber.

I am aware that certain patents, including British Patent 315,916, German Patent 578,965 and the corresponding United States Patent 1,911,672 of Bock and Tschunkur, are based on the discovery that plastic polymers, consisting solely of polymerizable diene hydrocarbons, are reinforced by carbon black when masticated as in the case of natural rubber. I am also aware that these patents specify that the carbon black may be added to the hydrocarbons before or after the polymerization step. The above patents make no distinction between the results obtained or obtainable when the carbon black is added to the unemulsified hydrocarbons, when it is added to the emulsified hydrocarbons, or when it is added to the coagulated rubbery mass after polymerization. While these patents contain examples of the addition of black to an emulsified hydrocarbon they show no method whereby the black may be caused to enter and be retained in a dispersed phase of an oil-in-water type of emulsion of the monomeric material.

It is to be understood that variations and modifications of the specific processes, products and apparatus herein shown and described for purposes of illustration may be made without departing from the spirit of my invention.

In the appended claims the term "polymer" is used in a generic sense to include copolymers. The terms "noninhibiting polymer" or "noninhibiting thickener" in the claims respectively designate those polymers and thickeners that do not prevent polymerization in the presence of a catalyst. The terms "rubbery-to-resinous polymer" and "rubbery-to-resinous thickener" include both rubbery and resinous polymers and thickeners.

What I claim is:

1. In a method of preparing a rubberlike material having properties modified with carbon black, the steps which comprise forming in water and in the presence of an emulsifier for oil-in-water emulsions an aqueous oil-in-water type of emulsion of an organic liquid mixture having carbon black distributed therein, having as one main polymerizable component a polymerizable conjugated diolefinic compound of less than nine aliphatic carbon atoms, and containing dissolved therein a thickener which is soluble in said organic liquid and which is selected from the group consisting of solid polymers of mono-olefinic compounds and rubbery polymers of conjugated diolefinic compounds, and while maintaining said emulsion under liquefying pressure in oil-in-water form catalyzing the polymerization of polymerizable ingredients thereof to form a rubberlike material, whereby a finely divided, synthetic, vulcanizable rubberlike material having effective amounts of carbon black within the globules thereof is obtained.

2. The method of claim 1 wherein prior to forming said oil-in-water type of emulsion of said liquid mixture the carbon black and at least one component of said organic liquid-thickener mixture are ground together to subject the black to shear in the presence of a component of said liquid-thickener mixture and to improve dispersion of the black in said liquid.

3. The method of claim 1 wherein a dispersing agent for carbon black in said organic liquid is also present in said organic liquid prior to the polymerization of the polymerizable constituents thereof.

4. The method of claim 1 wherein a hydrophilic colloid is present as at least part of said oil-in-water emulsifier.

5. The method of claim 1 wherein a hydrophilic colloid and a surface active emulsifying agent are both present as said emulsifier for oil-in-water emulsion, and wherein the carbon black is dispersed in the mixture of said organic liquid and thickener by subjecting it to shear in the presence of at least one component of said liquid mixture.

6. The method of claim 1 wherein the organic liquid comprises butadiene and an aryl olefinic compound copolymerizable therewith, wherein a dispersing agent for carbon black in said organic liquid is present in said liquid mixture to improve dispersion, and wherein the amount of carbon black is at least 10% of the polymerizable components of said mixture to be converted by polymerization into a rubbery polymer.

7. The method of claim 1 wherein said carbon black is dispersed within the organic liquid-thickener mixture and wherein said thickener is further characterized by comprising a rubbery polymer of a mono-olefinic compound.

8. The method of claim 1 wherein said carbon black is dispersed in the organic liquid-thickener mixture prior to forming it into the disperse phase of said oil-in-water emulsion and wherein said thickener is further characterized by being a polymer of a polymerizable constituent of said organic liquid.

9. The method of claim 1 wherein said carbon black is dispersed in the organic liquid-thickener mixture prior to maintaining it as the disperse phase of said oil-in-water type of emulsion, wherein said thickener is further characterized by being a rubbery polymer of an olefinic compound, and wherein said organic liquid-thickener mix contains a dispersing agent for carbon black in said organic liquid.

10. The method of claim 1 wherein said carbon black is dispersed within the organic liquid-thickener mixture and wherein the thickener is further characterized by comprising a rubbery polymer of a conjugated diolefinic compound.

11. The method of claim 1 wherein said carbon black is dispersed within the organic liquid-thickener mixture prior to forming an oil-in-water emulsion thereof, wherein said thickener is further characterized by comprising rubbery polyisobutylene and wherein polymerizable constituents of said organic liquid comprise butadiene and an aryl olefinic compound copolymerizable therewith.

12. The method of claim 1 wherein said carbon black is dispersed in the organic liquid-thickener mixture prior to maintaining it in the form of an oil-in-water emulsion and wherein said polymerization of polymerizable constituents of said emulsion to form a rubberlike material is accomplished in the substantial absence of a vapor space above said oil-in-water emulsion, whereby separation of black and monomeric materials by vaporization is reduced.

13. The method of claim 1 wherein said organic liquid mixture contains a dispersing agent for carbon black in said organic liquid, wherein said carbon black is dispersed in the organic liquid-thickener mixture prior to maintaining it in the form of an oil-in-water emulsion and wherein said polymerization of polymerizable constituents of said emulsion to form a rubberlike material is accomplished in the substantial absence of a vapor space above said oil-in-water emulsion, whereby separation of black and monomeric materials by vaporization is reduced.

14. The method of claim 1 wherein said emulsifier comprises a hydrophilic colloid, wherein said carbon black is dispersed in the organic liquid-thickener mixture prior to maintaining it in the form of an oil-in-water emulsion and wherein said polymerization of polymerizable constituents of said emulsion to form a rubberlike material is accomplished in the substantial absence of a vapor space above said oil-in-water emulsion, whereby separation of black and monomeric materials by vaporization is reduced.

15. The method of claim 1 wherein said carbon black is dispersed in the organic liquid-thickener mixture prior to maintaining it in the form of an oil-in-water emulsion, wherein said thickener is further characterized by being a rubbery polymer of an olefinic compound and wherein said organic liquid is further characterized by comprising butadiene and a mono-olefinic compound copolymerizable therewith, and wherein said polymerization of polymerizable constituents of said emulsion to form a rubberlike material is accomplished in the substantial absence of a vapor space above said oil-in-water emulsion, whereby separation of black and monomeric materials by vaporization is reduced.

16. In a method of preparing a finely divided polymer modified by carbon black, the steps which comprise forming an aqueous dispersion of carbon black, mixing with said dispersion an organic liquid that is substantially immiscible with water and is capable of being converted to the plastic rubbery state, treating said mixture to form a water-in-oil type of emulsion and cause said carbon black to migrate into the polymerizable material, reversing the phase of said emulsion to provide disperse polymerizable particles carrying carbon black, and initiating polymerization with a suitable catalyst and maintaining, by presence of sufficient emulsifier for stabilizing oil-in-water emulsions, said reversed emulsion under polymerizing conditions until a substantial portion thereof is converted to the rubbery state, whereby a finely divided, plastic rubbery material having carbon black dispersed therein is produced, said carbon black being present in amounts of 10% to 60% of the polymerized material, said organic liquid containing at the time of the reversing of phase of said emulsion a thickener soluble in said organic liquid, and selected from the group consisting of solid polymers of mono-olefinic compounds and rubbery polymers of conjugated diolefinic compounds, and comprising a polymerizable conjugated diene of less than nine carbon atoms.

17. The method of claim 16 wherein said emulsifier comprises a surface active emulsifying agent and a hydrophilic protective colloid.

18. The method of claim 16 wherein a suitable dispersing agent for carbon black in the polymerizable material is present, which agent is soluble in said polymerizable material.

19. In a method of preparing a finely divided polymer modified by carbon black, the steps which comprise forming an aqueous dispersion of carbon black, mixing with said aqueous dispersion an organic liquid containing an emulsion polymerizable diolefinic compound of less than nine carbon atoms, which is substantially immiscible with water and which is capable of being converted to the plastic state, forming a water-in-oil type of emulsion having the polymerizable material as a continuous phase to cause said carbon black to flush into the polymerizable material, treating the mixture of said polymerizable material and said carbon black to convert it into the disperse phase of an emulsion, initiating more rapid polymerization with a suitable catalyst, and maintaining the material thereof under polymerizing conditions until a portion is converted to a rubbery state by subjecting the polymerizable material to a suitable catalyst in the presence of a protective colloid for stabilizing oil-in-water emulsion under conditions whereby refluxing of the polymerizable material is prevented, whereby a finely divided, plastic rubbery material having carbon black dispersed therein is produced, said polymerizable material being thickened by a suitable polymer dissolved therein when it is converted to the disperse phase of the emulsion.

20. An aqueous dispersion of an unmasticated rubbery polymer of a polymerizable conjugated diolefinic compound of less than nine aliphatic carbon atoms, said rubbery polymer being in the form of discrete particles containing carbon black therein to modify the physical properties thereof, said particles being formed by emulsifying in water containing an emulsifying agent for maintaining oil-in-water emulsions, a liquid mixture of said diolefinic compound, and a polymer soluble in the monomer, and selected from the group consisting of solid polymers of mono-olefinic compounds and rubbery polymers of conjugated diolefinic compounds, which liquid mixture contains carbon black dispersed therein, and polymerizing polymerizable constituents of globules of said mixture in said emulsion to the rubbery state.

21. An aqueous dispersion of an unmasticated rubbery polymer of a polymerizable conjugated diolefin of less than nine aliphatic atoms and of a mono-olefinic compound copolymerizable therewith, said rubbery polymer being in the form of discrete particles containing carbon black therein to modify the physical properties thereof, said particles being formed by emulsifying in water containing an emulsifying agent for maintaining oil-in-water emulsions, a liquid mixture of said diolefinic compound, a dispersing agent for carbon black in said liquid mixture, and a polymer soluble in the monomer, and selected from the group consisting of solid polymers of mono-olefinic compounds and rubbery polymers of conjugated diolefinic compounds, which liquid mixture contains carbon black dispersed therein, and polymerizing polymerizable constituents of globules of said mixture in said emulsion to the rubbery state with the aid of a suitable catalyst.

THEODORE A. TE GROTENHUIS.

REFERENCES CITED

The following references are of record in the file of this patent:

UNITED STATES PATENTS

| Number | Name | Date |
|---|---|---|
| 1,171,187 | Glidden | Feb. 8, 1916 |
| 1,911,672 | Bock et al. | May 30, 1933 |
| 1,967,861 | Collins | July 24, 1934 |
| 2,127,591 | Evans | Aug. 23, 1938 |
| 2,240,618 | Harris et al. | May 6, 1941 |
| 2,244,020 | Patton | June 3, 1941 |
| 2,354,424 | Novotny | July 25, 1944 |

FOREIGN PATENTS

| Number | Country | Date |
|---|---|---|
| 328,812 | Great Britain | May 8, 1930 |